United States Patent [19]

Merlo et al.

[11] Patent Number: 6,048,161
[45] Date of Patent: Apr. 11, 2000

[54] VEHICLE HAVING A LIFTING BOOM, WHICH CAN BE USED AS AN AGRICULTURAL MACHINE

[75] Inventors: Amilcare Merlo; Renato Galfre', both of Merlo, Italy

[73] Assignee: Merlo Spa Industria Metalmeccanica, Cuneo, Italy

[21] Appl. No.: 09/274,125

[22] Filed: Mar. 23, 1999

[30] Foreign Application Priority Data

Mar. 27, 1998 [IT] Italy .................................. T098A0271

[51] Int. Cl.[7] ........................................................ B60P 01/00
[52] U.S. Cl. ........................ 414/680; 414/685; 414/703; 180/53.3
[58] Field of Search ................................. 414/680, 685, 414/686, 703, 723; 180/53.3

[56] References Cited

U.S. PATENT DOCUMENTS

| | | | |
|---|---|---|---|
| 2,622,749 | 12/1952 | Stuhr | 414/703 |
| 4,121,680 | 10/1978 | Van Der Lely | 180/53.3 |
| 4,687,407 | 8/1987 | Osborne | 414/703 |
| 4,940,096 | 7/1990 | Johnson | 414/24.5 |
| 4,986,721 | 1/1991 | Lowder et al. | 414/685 |
| 5,150,999 | 9/1992 | Dugan | 414/703 |
| 5,822,892 | 10/1998 | Ohbatake et al. | 414/685 |
| 5,836,733 | 11/1998 | Moses et al. | 414/685 |

*Primary Examiner*—Gregory A. Morse
*Attorney, Agent, or Firm*—Cantor Colburn LLP

[57] ABSTRACT

A vehicle having a lifting boom, comprising a load-carrying frame (12) having a front section (12a) and a rear section (12b), a lifting boom (18) extending parallel to the longitudinal axis of the vehicle and articulated to the frame (12) in the rear section (12b), an operating and driving cab (28) placed on a side of the vehicle (18) and an internal combustion engine placed on the opposite side of the boom (18) with respect to the operating cab (28). The rear section (12b) of the frame has a platform on which a lifting device is mounted, in particular operatively associated to a three-point hitch, whereby the vehicle can be used also as an agricultural machine.

8 Claims, 4 Drawing Sheets

VEHICLE HAVING A LIFTING BOOM, WHICH CAN BE USED AS AN AGRICULTURAL MACHINE

BACKGROUND OF THE INVENTION

The present invention relates to a vehicle having a lifting boom, of the type known from EP-A-0375705 of the same Applicant.

Vehicles having a longitudinal telescopic lifting boom, projecting from the front section of the vehicle and articulated to the rear section of the frame have shown a great versatility of use. Remaining the same the basic structure of the vehicle, it is possible to manufacture vehicles intended to be used as aerial platforms, machines for use in building constructions, forklifts, etc.

The present invention has the object to provide improvements which permit to further increase the field of use of a vehicle with lifting boom of this type.

SUMMARY OF THE INVENTION

According to the present invention this object is achieved by a vehicle comprising a load-carrying frame having a front section and a rear section; a lifting boom parallel to the longitudinal axis of the vehicle and articulated to the rear section of the frame; an operating cab and an internal combustion engine placed on opposite sides of the boom.

The rear section of the frame is provided with a platform on which a lifting device is mounted, in particular operatively associated to a three-point hitch, so that the vehicle can be used also as an agricultural machine.

The vehicle according to the present invention can perform all the functions of a normal agricultural tractor and furthermore as all the advantages deriving by the presence of a lifting boom with high performances. For completing the functions of an agricultural machine, the vehicle according to the invention is preferably provided with a power takeoff arranged below the platform adapted to receive the lifting device. In order to permit operation of the power takeoff directly from the output shaft of the internal combustion engine, the engine is preferably arranged with its longitudinal axis inclined with respect to the longitudinal axis of the vehicle.

BRIEF DESCRIPTION OF THE DRAWINGS

Further characteristics and advantages of the vehicle according to the present invention will become clear in the course of the detailed description which follows, given purely by way of non-limiting example, with reference to the annexed drawings, in which.

DETAILED DESCRIPTION OF THE INVENTION

Figure 1:
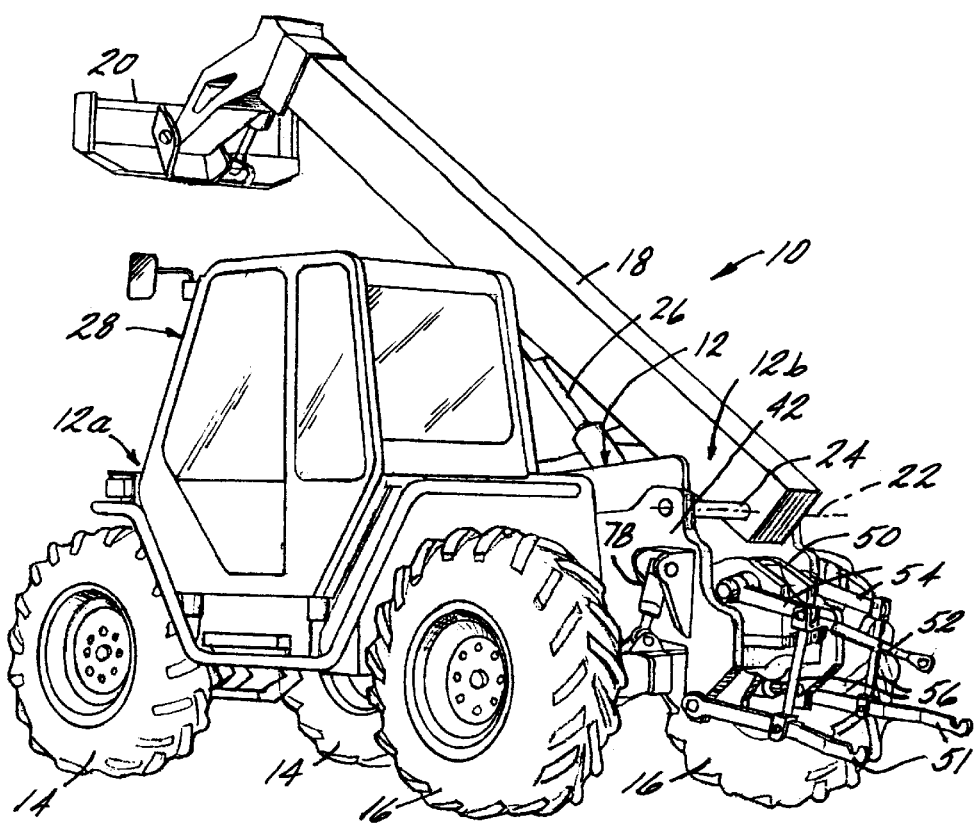
FIG. 1 is a perspective view of a vehicle according to the present invention.

Referring to the drawings, a vehicle according to the present invention is indicated at 10. The vehicle 10 comprises a load-bearing frame 12 formed by sturdy welded sheet metal. The frame 12 has a front section 12a and a rear section 12b, carrying respective axles for the front and the rear wheels 14, 16. Preferably, the wheels 14 and 16 have all the same diameter and all of them are both steering and motor-driven.

The vehicle 10 is provided with a boom 18 formed by a sturdy box-shaped beam with a rectangular cross-section. The boom 18 can be simple or telescopic and carries at its free end a base 20 for fixing thereto an implement (not shown) which depending on the needs can be a fork, a shovel, an aerial platform, etc. The boom 18 is articulated to the rear section 12b about an horizontal transversal axis 22, formed by a trunnion 24. In a way per se known, a lifting cylinder 26 has its ends articulated to the boom and frame.

Figure 5:
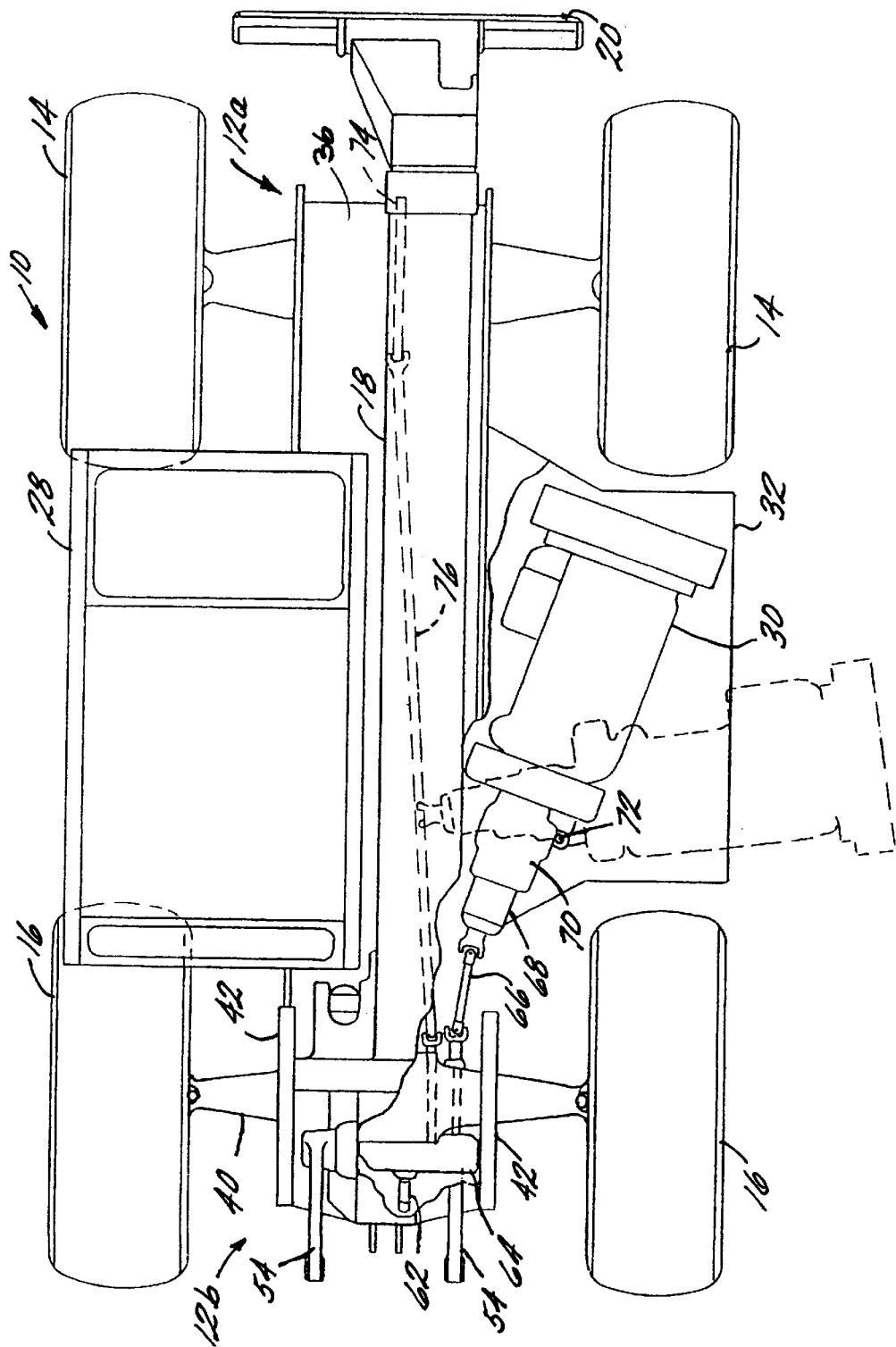
FIG. 5 is a plan view of the vehicle of FIG. 1.

With particular reference to FIG. 5, in a lowered position the boom 18 extends parallel to the longitudinal axis of the vehicle and its free end projects beyond the front section 12a. On a side of the longitudinal boom 18 is arranged a control and driving cab 28 wherein are housed an operator seat (not shown) as well as all the mechanical, electrical and hydraulic systems and devices for driving the vehicle and for operating the boom 18 and all the accessory devices of the vehicle 10. Referring always to FIG. 5, the vehicle 10 is provided with an internal combustion engine 30 which is arranged on the opposite side of the boom 18 with respect to the control cab 28 and is placed between the two wheels 14, 16 of this side of the vehicle. For the reasons which will be clear in the following of the description, the engine 30 is arranged with its longitudinal axis inclined with respect to the longitudinal axis of the vehicle. This inclination can be for example of about 10–30°. For avoiding interference with the lateral visibility of the operator, the whole engine assembly is enclosed in a housing 32 which is located below ar horizontal plane tangent to the upper side of the boon, 18 when the boom is in its completely lowered configuration. For the same reason, when the boom 18 is in its completely lowered position, it is partially received in a channel-shaped portion 36 of the frame, having a width at least equal to the width of the boom 18. In this way, in its completely lowered position, the boom 18 extends in a substantially horizontal position and lies well below the line of lateral visibility of the operator.

Figure 2:
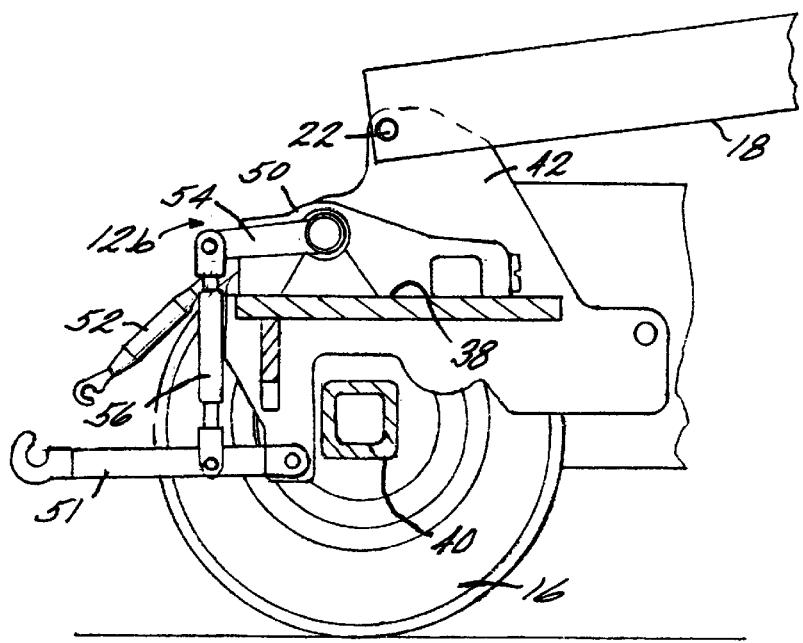
FIG. 2 is a cross-section of the rear part of the vehicle of FIG. 1.
Figure 3:
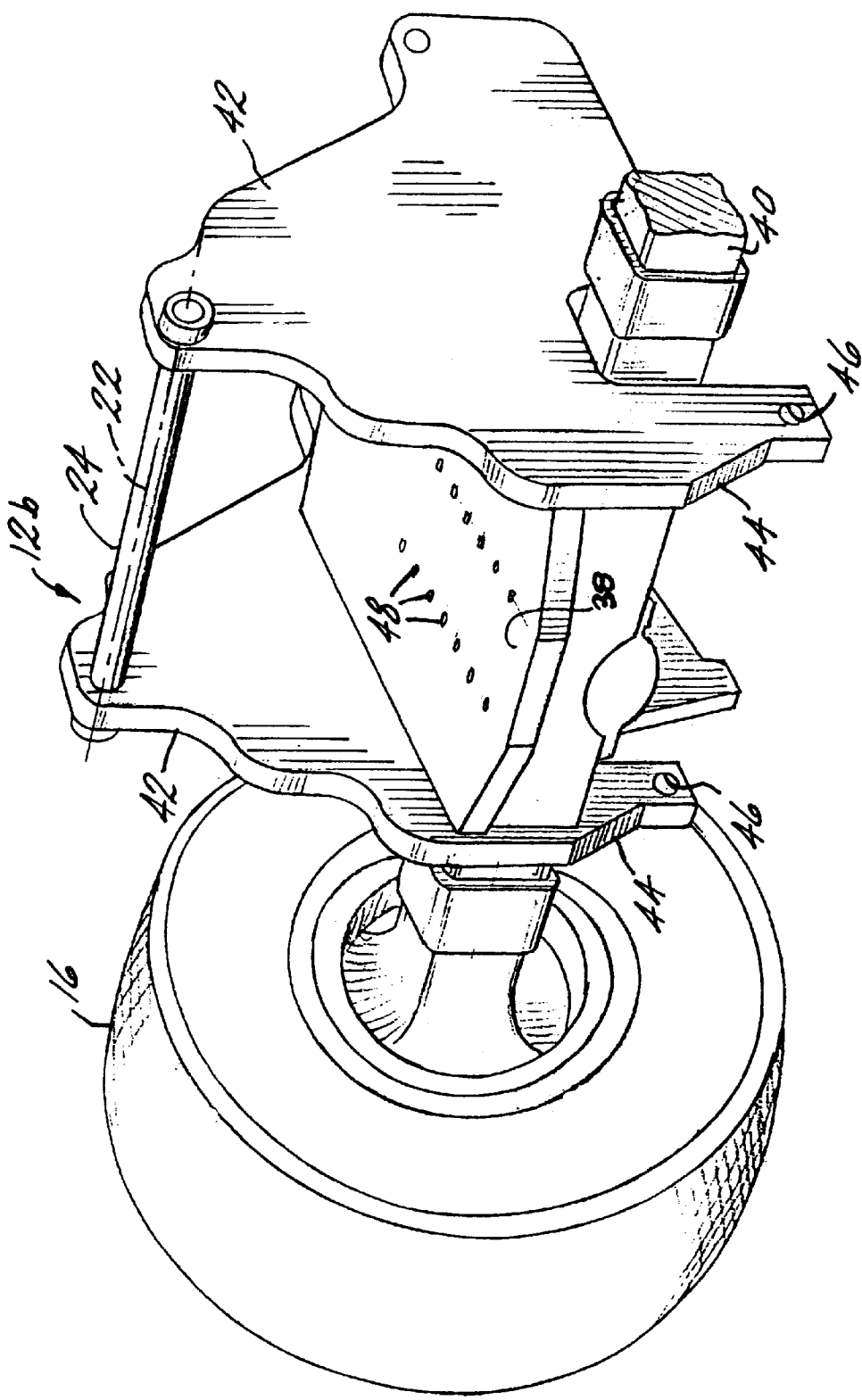
FIG. 3 is a perspective view of the rear section of the frame of the vehicle of FIG. 1, without the lifting device.
Figure 4:
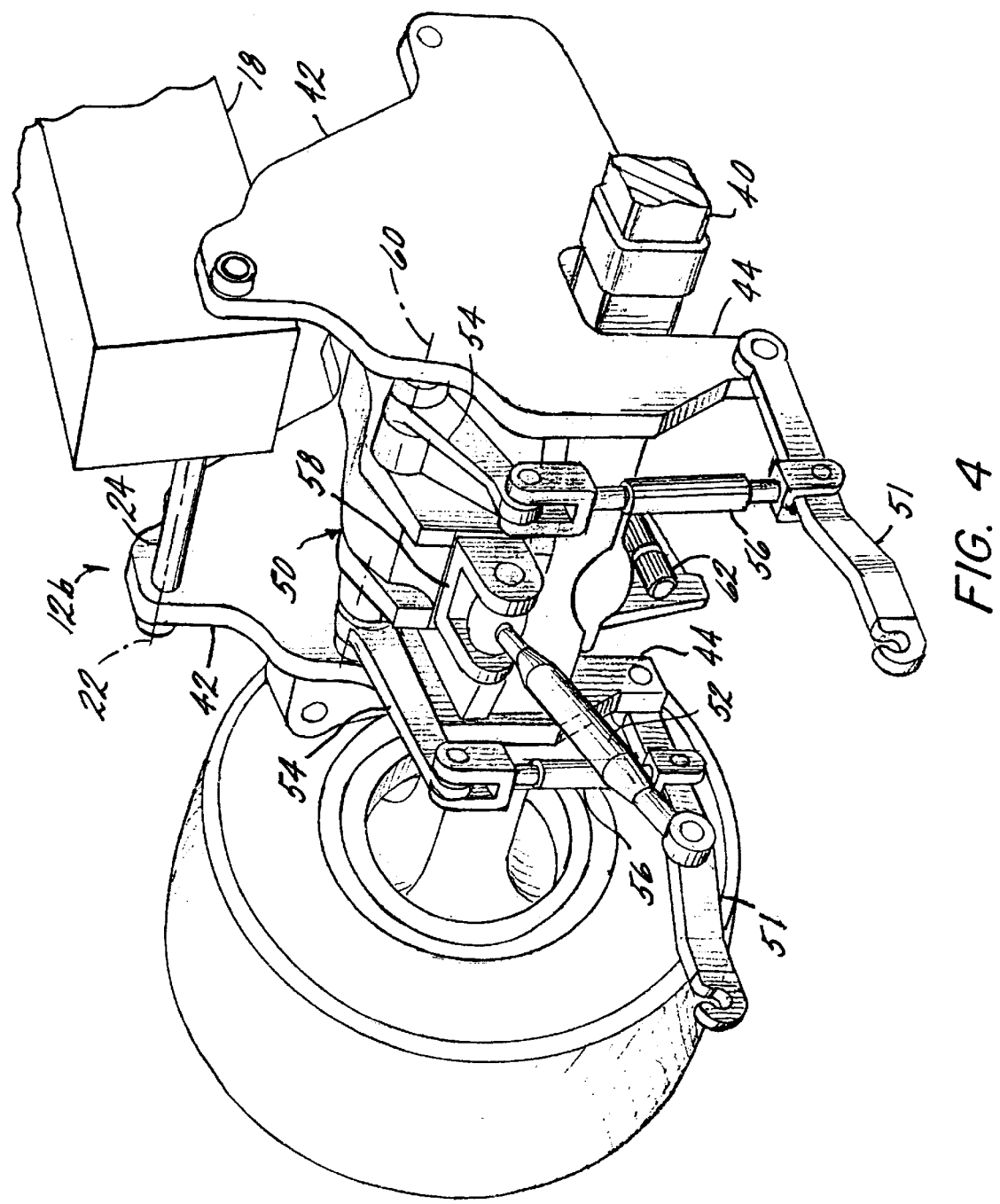
FIG. 4 is a perspective vies similar to FIG. 3, showing the vehicle provided with a three-point hitch and with the respective lifting device.

Referring now to FIG. 3, the rear section 12a of the frame has an horizontal platform 38 which extends above the axle 40 of the rear wheels. The platform 38 extends at least partially beyond the rear axle 40 towards the rear of the vehicle and is placed below the trunnion 24 forming the articulation axis of the boom 18. With respect to the trunnion 24, the platform 38 is at least partially shifted toward the rear portion of the vehicle. The platform 38 is laterally delimited by a pair of wall 42 formed by sturdy sheet metal, which form a support for the trunnion 24. The lateral walls 42 are an integral part of the frame and are arranged on the extension of the lateral walls of the channel-shaped portion 36. Each of these lateral walls 42 has a projection 44 arranged backwardly with respect to the rear axle 40. The projections 44 extend below the lower axle 40 and have respective holes 46 whose axes are aligned along a transversal axis. The platform 38 has a machined reference zone where are formed a plurality of holes 48 for fixing a lifting device indicated at 50 in FIGS. 2 and 4.

In the example shown in the figures, the rear section 12b is provided with a three-point hitch comprising, in a way per se known, two lower arms 51 and an upper central arm 52. The lifting device 50 is operatively associated to the lower arms 51 of the three-point hitch by means of the respective lifting levers 54 and tie rods 56. The lower arms 51 are articulated in the holes 46 of the projections 44 whereas the central upper arm 52 of the three-point hitch is articulated to a bracket 58 carried by the lifting device 50. In a way per se known, the lifting device 50 is adapted to rotate together the lifting levers 54 about a transversal axis 60 and this rotation raises or lowers the lower arms 51. The lifting device 50 is driven by an hydraulic unit associated with the internal combustion engine 30 and is operated by the operator by means of hydraulic distributors placed in the control cab.

The three-point hitch 51, 52 is a standard attachment which permits to mount on the vehicle 10 any type of agricultural implement and permits the use in the agricultural field of a vehicle whose structure and architecture have been designed with the main object of having a lifting boom with high performances in terms of reachable hights and weight which can be lifted. In this way, the vehicle according to the invention has all the merits and advantages of both a lifting boom device and a modern agricultural tractor.

Even if the tree-point hitch i3 an ideal device for equipping a vehicle according to the present invention, it is not excluded that in alternative the vehicle can be provided with a lifting device of a different nature, such as for example a crane or the like, mounted on the rear platform 38. A particularly advantageous aspect of the horizontal platform 38 according to the present invention consists in that it is arranged so as to be visible by the operator in the cab 28, which considerably simplified the task of the operator during the operation of the lifting device 50.

Furthermore, the vehicle according to the invention is preferably provided with a power takeoff 62 placed below platform 38 and also below the rear axle 40. As shown in FIG. 5, the power take-off 62 is mechanically driven by means of a reduction gear 64 and a drive shaft 66 connected, by means of a friction clutch 68, to the rotor of an hydraulic pump 70 connected to the output shaft of the internal combustion engine 30. The inclined disposition of the engine 30 has the purpose to drive mechanically the power takeoff 62 and has the further advantage to permit easy access to the engine-pump assembly for maintenance operations by virtue of the fact that such assembly is articulated to the frame about a vertical axis 72 (FIG. 5) and can be brought in the position shown in broken lines in FIG. 5, after having removed fixing screws (not shown) and after having disengaged the drive shaft 66. The vehicle according to the invention can also be provide with a front power takeoff 74 mechanically operated by a transmission shaft 76 connected to the reduction gear 64 of the rear power take-off 62.

Another particularly advantageous feature of the vehicle according to the invention consists in that the axles of the front wheels 14 and rear wheels 16 are both free to oscillate with respect to the frame 12 about a longitudinal axis and can be locked in a desired position by means of respective hydraulic cylinders 78, only one of which is visible in FIG. 1.

What is claimed is:

1. A vehicle having a lifting boom, comprising;
    a load-carrying frame having a front section and a rear section and provided with front and rear axles, each having a pair of wheels, said rear section including two parallel lateral walls having respective downwardly projecting portions,
    a lifting boom extending parallel to the longitudinal axis of the vehicle and articulated to the frame about an articulation axis carried by said lateral walls,
    an operating and driving cab placed on a side of said boom,
    an internal combustion engine placed on the opposite side of the boom with respect to the operating cab and arranged between the wheels of that side,
    a lifting device mounted between said lateral walls, the lifting device including a three-point hitch, having a pair of upper arms and a pair of lower arms articulated to said downwardly projecting portions.

2. A vehicle according to claim 1, wherein said lifting device is mounted on a platform extending along a substantially horizontal plane between said lateral walls.

3. A vehicle according to claim 2, wherein said platform is placed below the articulation axis of the lifting boom.

4. A vehicle according to claim 2, wherein said platform projects at least partially backwardly with respect to the articulation axis of the lifting boom and projects at least in part towards the rear part of the vehicle beyond the rear axle.

5. A vehicle according to claim 2, comprising a power takeoff arranged below said platform.

6. A vehicle according to claim 1, wherein said front axle and rear axle are free to oscillate with respect to the frame about a longitudinal axis and wherein said axles can be selectively locked in a predetermined position by means of respective hydraulic actuators.

7. A vehicle comprising:
    a load-carrying frame having a front section and a rear section and provided with front and rear axles, each having a pair of wheels,
    a lifting boom extending parallel to the longitudinal axis of the vehicle and articulated to the frame in the rear section,
    an operating and driving cab placed on a side of said boom,
    an internal combustion engine placed on the opposite side of the boom with respection to the operating cab and arranged between the wheels of that side,
    a lifting device including a three-point hitch having a pair of upper arms connected to a lifting device and a pair of lower arms articulated to the rear section of the frame, and
    a power takeoff mounted in the rear section of the frame and mechanically driven by means of a transmission connected to the output shaft of the internal combustion engine.

8. A vehicle according to claim 7, wherein the internal combustion engine is arranged with its own longitudinal axis inclined with respect to the longitudinal axis of the vehicle.

* * * * *

UNITED STATES PATENT AND TRADEMARK OFFICE
CERTIFICATE OF CORRECTION

PATENT NO.    : 6,048,161
DATED         : April 11, 2000
INVENTOR(S)   : Amilcare Merlo et al.

It is certified that error appears in the above-identified patent and that said Letters Patent is hereby corrected as shown below:

Column 1,
Line 59, after "perspective" delete "vies" and insert therefor -- view --

Column 2,
Line 34, after "below" delete "ar" and insert therefor -- an --
Line 35, after "upper side of the" delete "boon" and insert therefor -- boom --

Column 3,
Line 16, after "reachable" delete "hights" and insert therefor -- heights --
Line 20, after "Even if the" delete "tree" and insert therefor -- three --; and after "hitch" delete "i3" and insert therefor -- is --
Line 28, after "considerably" delete "simplified" and insert therefor -- simplifies --
Line 47, after "also be" delete "provide" and insert therefor -- provided --

Signed and Sealed this

Nineteenth Day of March, 2002

Attest:

*Attesting Officer*

JAMES E. ROGAN
*Director of the United States Patent and Trademark Office*